(12) United States Patent
Chitti et al.

(10) Patent No.: US 10,216,441 B2
(45) Date of Patent: Feb. 26, 2019

(54) DYNAMIC QUALITY OF SERVICE FOR STORAGE I/O PORT ALLOCATION

(71) Applicant: INTERNATIONAL BUSINESS MACHINES CORPORATION, Armonk, NY (US)

(72) Inventors: Mark V. Chitti, Lexington, KY (US); Douglas M. Freimuth, New York, NY (US); John F. Hollingsworth, Wynnewood, PA (US); Baiju D. Mandalia, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/952,463

(22) Filed: Nov. 25, 2015

(65) Prior Publication Data

US 2017/0147248 A1    May 25, 2017

(51) Int. Cl.
*G06F 3/06* (2006.01)

(52) U.S. Cl.
CPC .......... *G06F 3/0631* (2013.01); *G06F 3/0604* (2013.01); *G06F 3/067* (2013.01); *G06F 3/0653* (2013.01)

(58) Field of Classification Search
None
See application file for complete search history.

(56) References Cited

U.S. PATENT DOCUMENTS

| | | | |
|---|---|---|---|
| 4,144,414 A | 3/1979 | Nicholas | |
| 6,205,477 B1 | 3/2001 | Johnson et al. | |
| 6,389,432 B1 | 5/2002 | Srinivas et al. | |
| 6,418,139 B1 | 7/2002 | Akhtar | |
| 6,563,829 B1 | 5/2003 | Lyles et al. | |
| 6,738,348 B1 | 5/2004 | Rollins | |
| 6,937,566 B1 | 8/2005 | Forslow | |
| 7,089,294 B1* | 8/2006 | Baskey | H04L 12/5695 709/203 |
| 7,103,906 B1 | 9/2006 | Katz | |
| 7,542,420 B1 | 6/2009 | Mokhtar et al. | |

(Continued)

FOREIGN PATENT DOCUMENTS

WO    2014021839 A1    2/2014

OTHER PUBLICATIONS

Elali, Hala, SAN Zone Reuse in Port Allocation, https://coprhd.atlassian.net/wiki/spaces/COP/pages/8618000/SAN+Zone+Reuse+in+Port+Allocation, Oct. 15, 2015.*

(Continued)

*Primary Examiner* — Ryan Bertram
*Assistant Examiner* — Edmund H Kwong
(74) *Attorney, Agent, or Firm* — William Hartwell; Matthew M. Hulihan; Heslin Rothenberg Farley & Mesiti PC

(57) ABSTRACT

Dynamic quality of service for storage I/O port allocation is provided by obtaining indications of anticipated demand on a plurality of storage ports of a storage device of a data center, the anticipated demand being at least in part for storage input/output supporting transfer of data to or from a network, and dynamically adjusting storage port allocations based on the indications of anticipated demand and on real-time evaluation of workloads being serviced by the plurality of storage ports.

19 Claims, 5 Drawing Sheets

(56) References Cited

U.S. PATENT DOCUMENTS

| | | |
|---|---|---|
| 7,590,746 B2 | 9/2009 | Slater |
| 7,685,310 B2 | 3/2010 | Ueoka et al. |
| 7,808,918 B2 | 10/2010 | Bugenhagen |
| 7,844,967 B2 | 11/2010 | Kelly |
| 7,983,299 B1 | 7/2011 | Ma |
| 8,412,824 B1 | 4/2013 | Schiff |
| 8,464,335 B1 | 6/2013 | Sinha et al. |
| 8,660,008 B2 | 2/2014 | Babiarz et al. |
| 8,762,505 B2 | 6/2014 | Kutan et al. |
| 8,788,690 B2 | 7/2014 | Short et al. |
| 8,793,343 B1 | 7/2014 | Sorenson, III et al. |
| 8,799,320 B2 | 8/2014 | Chan et al. |
| 8,873,753 B2 | 10/2014 | Parker |
| 8,937,865 B1 | 1/2015 | Kumar et al. |
| 9,026,671 B2 | 5/2015 | Gillies et al. |
| 9,172,771 B1 | 10/2015 | Gross et al. |
| 9,207,993 B2 | 12/2015 | Jain |
| 9,330,156 B2 | 5/2016 | Satapathy |
| 9,495,251 B2 | 11/2016 | Kottomtharayil |
| 9,535,776 B2 | 1/2017 | Klose |
| 9,596,144 B2 | 3/2017 | Anderson |
| 2002/0049841 A1 | 4/2002 | Johnson |
| 2002/0101869 A1 | 8/2002 | Garcia-Luna-Aceves et al. |
| 2002/0112113 A1 | 8/2002 | Karpoff et al. |
| 2002/0124262 A1 | 9/2002 | Basso et al. |
| 2002/0133613 A1 | 9/2002 | Teng et al. |
| 2002/0144174 A1 | 10/2002 | Nwabueze |
| 2002/0181394 A1 | 12/2002 | Partain et al. |
| 2002/0194324 A1 | 12/2002 | Guha |
| 2003/0021338 A1 | 1/2003 | Mazzoni |
| 2003/0037061 A1 | 2/2003 | Sastri et al. |
| 2003/0069963 A1 | 4/2003 | Jayant et al. |
| 2003/0110263 A1 | 6/2003 | Shillo |
| 2003/0120666 A1 | 6/2003 | Tacaille et al. |
| 2003/0126132 A1 | 7/2003 | Kavuri et al. |
| 2003/0172130 A1 | 9/2003 | Fruchtman et al. |
| 2003/0202477 A1 | 10/2003 | Zhen et al. |
| 2004/0098671 A1 | 5/2004 | Graham et al. |
| 2004/0198360 A1 | 10/2004 | Kotzin |
| 2004/0199566 A1 | 10/2004 | Carlson et al. |
| 2004/0215644 A1 | 10/2004 | Edwards, Jr. et al. |
| 2004/0215749 A1 | 10/2004 | Tsao |
| 2004/0246972 A1 | 12/2004 | Wang et al. |
| 2005/0027345 A1 | 2/2005 | Horan et al. |
| 2005/0033935 A1 | 2/2005 | Manbert et al. |
| 2005/0125593 A1 | 6/2005 | Karpoff et al. |
| 2005/0129000 A1 | 6/2005 | Sivakumar et al. |
| 2005/0154841 A1 | 7/2005 | Sastri et al. |
| 2005/0289618 A1 | 12/2005 | Hardin |
| 2006/0039381 A1 | 2/2006 | Anschutz et al. |
| 2006/0120282 A1 | 6/2006 | Carlson et al. |
| 2006/0129562 A1 | 6/2006 | Pulamarasetti et al. |
| 2006/0171390 A1 | 8/2006 | LaJoie |
| 2006/0206682 A1 | 9/2006 | Manbert et al. |
| 2006/0218369 A1 | 9/2006 | Fujino |
| 2006/0248231 A1 | 11/2006 | O'Rourke et al. |
| 2006/0265558 A1 | 11/2006 | Fujino |
| 2007/0022264 A1 | 1/2007 | Bromling et al. |
| 2007/0065078 A1 | 3/2007 | Jiang |
| 2007/0106798 A1 | 5/2007 | Masumitsu |
| 2007/0195765 A1 | 8/2007 | Heissenbuttel et al. |
| 2007/0198627 A1 | 8/2007 | Bozionek et al. |
| 2008/0109450 A1 | 5/2008 | Clark et al. |
| 2008/0115144 A1 | 5/2008 | Tsao |
| 2008/0126525 A1* | 5/2008 | Ueoka ............... H04L 43/0817 709/223 |
| 2008/0140850 A1 | 6/2008 | Gade et al. |
| 2008/0259798 A1 | 10/2008 | Loh |
| 2008/0320097 A1 | 12/2008 | Sawicki et al. |
| 2009/0007199 A1 | 1/2009 | JaJoie |
| 2009/0061853 A1 | 3/2009 | Anschutz |
| 2009/0100163 A1 | 4/2009 | Tsao |
| 2009/0172782 A1 | 7/2009 | Taglienti et al. |
| 2009/0187668 A1 | 7/2009 | Arendt et al. |
| 2009/0204711 A1 | 8/2009 | Binyamin |
| 2009/0217326 A1 | 8/2009 | Hasek |
| 2009/0240867 A1 | 9/2009 | Shibayama et al. |
| 2009/0271589 A1 | 10/2009 | Karpoff et al. |
| 2010/0257602 A1 | 10/2010 | Kettler et al. |
| 2010/0268632 A1 | 10/2010 | Rosenthal |
| 2010/0274656 A1 | 10/2010 | Genschel |
| 2010/0306382 A1 | 12/2010 | Cardosa |
| 2010/0306445 A1 | 12/2010 | Dake |
| 2010/0332401 A1 | 12/2010 | Prahlad et al. |
| 2011/0004550 A1 | 1/2011 | Giordano et al. |
| 2011/0022697 A1 | 1/2011 | Huh |
| 2011/0078227 A1 | 3/2011 | McAloon et al. |
| 2011/0083037 A1 | 4/2011 | Bocharov et al. |
| 2011/0125889 A1 | 5/2011 | Tsao |
| 2011/0158653 A1 | 6/2011 | Mazed |
| 2011/0208710 A1 | 8/2011 | Lesavich |
| 2011/0218770 A1 | 9/2011 | Ii |
| 2011/0282928 A1 | 11/2011 | Ball et al. |
| 2011/0293278 A1 | 12/2011 | Mazed |
| 2012/0023545 A1 | 1/2012 | Qu |
| 2012/0063353 A1 | 3/2012 | Schlenk |
| 2012/0072600 A1 | 3/2012 | Richardson et al. |
| 2012/0109705 A1 | 5/2012 | Belady et al. |
| 2012/0131309 A1 | 5/2012 | Johnson |
| 2012/0137173 A1 | 5/2012 | Burshan et al. |
| 2012/0180080 A1 | 7/2012 | LaJoie |
| 2012/0201130 A1 | 8/2012 | Liv et al. |
| 2012/0210381 A1 | 8/2012 | Ozawa |
| 2012/0216259 A1 | 8/2012 | Okamoto et al. |
| 2012/0331221 A1 | 12/2012 | Cho |
| 2013/0003538 A1 | 1/2013 | Greenberg et al. |
| 2013/0007254 A1 | 1/2013 | Fries |
| 2013/0031258 A1 | 1/2013 | Mukai et al. |
| 2013/0081014 A1 | 3/2013 | Kadatch |
| 2013/0185404 A1* | 7/2013 | Patel ............... H04L 61/2557 709/222 |
| 2013/0204963 A1 | 8/2013 | Boss et al. |
| 2013/0205002 A1 | 8/2013 | Wang et al. |
| 2013/0212282 A1 | 8/2013 | Pulier |
| 2013/0212422 A1 | 8/2013 | Bauer et al. |
| 2013/0227009 A1 | 8/2013 | Padmanaban et al. |
| 2013/0242903 A1 | 9/2013 | Narkar |
| 2013/0254383 A1 | 9/2013 | Wray |
| 2013/0254407 A1 | 9/2013 | Pijewski |
| 2013/0268672 A1 | 10/2013 | Justafort |
| 2013/0282795 A1 | 10/2013 | Tsao |
| 2014/0040343 A1 | 2/2014 | Nickolov et al. |
| 2014/0057592 A1 | 2/2014 | Chetlur |
| 2014/0068076 A1 | 3/2014 | Dasher et al. |
| 2014/0075029 A1 | 3/2014 | Lipchuk |
| 2014/0082301 A1 | 3/2014 | Barton et al. |
| 2014/0082681 A1 | 3/2014 | Brown et al. |
| 2014/0089510 A1* | 3/2014 | Hao ............... G06F 9/5072 709/226 |
| 2014/0098685 A1 | 4/2014 | Shattil |
| 2014/0115189 A1* | 4/2014 | Ao ............... H04L 45/245 709/250 |
| 2014/0129819 A1 | 5/2014 | Huang et al. |
| 2014/0180664 A1 | 6/2014 | Kochunni et al. |
| 2014/0188801 A1 | 7/2014 | Ramakrishnan et al. |
| 2014/0207968 A1* | 7/2014 | Kumar ............... H04L 45/38 709/244 |
| 2014/0233587 A1 | 8/2014 | Liv et al. |
| 2014/0244835 A1 | 8/2014 | Lopez Alvarez |
| 2014/0258535 A1 | 9/2014 | Zhang |
| 2014/0281015 A1 | 9/2014 | Orona et al. |
| 2014/0289205 A1 | 9/2014 | Soichi |
| 2014/0344879 A1 | 11/2014 | Phillips et al. |
| 2014/0365658 A1 | 12/2014 | Lang et al. |
| 2015/0006614 A1 | 1/2015 | Suryanarayanan |
| 2015/0019740 A1 | 1/2015 | Zhao |
| 2015/0026793 A1 | 1/2015 | Li |
| 2015/0046960 A1 | 2/2015 | Hardin |
| 2015/0067093 A1 | 3/2015 | Sawicki et al. |
| 2015/0067744 A1 | 3/2015 | Furtwangler |
| 2015/0082362 A1 | 3/2015 | Hasek |
| 2015/0117198 A1 | 4/2015 | Menezes et al. |
| 2015/0134731 A1 | 5/2015 | Wang et al. |
| 2015/0134830 A1 | 5/2015 | Popa |

(56) References Cited

U.S. PATENT DOCUMENTS

| | | |
|---|---|---|
| 2015/0156204 A1 | 6/2015 | Resch |
| 2015/0172070 A1 | 6/2015 | Csaszar |
| 2015/0195173 A1 | 7/2015 | Gupta et al. |
| 2015/0222445 A1 | 8/2015 | Iyer et al. |
| 2015/0234636 A1 | 8/2015 | Barnes, Jr. |
| 2015/0235308 A1 | 8/2015 | Mick et al. |
| 2015/0288919 A1 | 10/2015 | Labosco |
| 2015/0339169 A1 | 11/2015 | Siddiqui et al. |
| 2016/0066261 A1 | 3/2016 | Nasielski et al. |
| 2016/0197835 A1 | 7/2016 | Luft |
| 2016/0197848 A1 | 7/2016 | Bhide |
| 2016/0231948 A1* | 8/2016 | Gupta ............ G06F 3/0611 |
| 2017/0076057 A1 | 3/2017 | Burton |
| 2017/0090773 A1 | 3/2017 | Vijayan |
| 2018/0062943 A1 | 3/2018 | Djukic et al. |

OTHER PUBLICATIONS

Office Action in U.S. Appl. No. 14/731,834, dated Apr. 19, 2017, pp. 1-22.

Hwang et al., "Design and Implementation of an iLVM Mechanism for Remote Mirror", Kuasir College of Electrical Engineering and Computer Science, Department of Electrical Engineering, Journal of Internet Technology, 7(2), Apr. 2006, pp. 169-176.

XRoads Networks, "Dynamic Bandwidth Management", retrieved from internet Nov. 11, 2014, http://dualwanfirewalls.com/ubm/solutions/dynamic_bandwidth_control.xrn, pp. 1-4.

IBM, Internal Model for Dynamically-Virtualizing the Storage of Data Between a RAID-6 and a Mirror, IP.com, No. 000160533, Nov. 19, 2007, pp. 1-5.

Weil, Reliable, Scalable, and High-Performance Distributed Storage: Distributed Object Storage, IP.com, No. 000234957, Feb. 19, 2014, pp. 1-11.

List of IBM Patents or Patent Applications Treated as Related, Dec. 1, 2015, pp. 1-2.

Office Action in U.S. Appl. No. 14/952,437, dated Sep. 18, 2017, pp. 1-36.

Notice of Allowance in U.S. Appl. No. 14/952,456, dated Sep. 15, 2017, pp. 1-14.

Office Action in U.S. Appl. No. 14/952,456, dated May 17, 2017, pp. 1-25.

Office Action in U.S. Appl. No. 14/952,466, dated Jun. 26, 2017, pp. 1-35.

Office Action in U.S. Appl. No. 14/952,449, dated Jul. 25, 2017, pp. 1-41.

Office Action in U.S. Appl. No. 14/952,469, dated Oct. 3, 2017, pp. 1-51.

List of IBM Patents or Patent Applications Treated as Related, Dec. 18, 2017, pp. 1-2.

* cited by examiner

DYNAMIC QUALITY OF SERVICE FOR STORAGE I/O PORT ALLOCATION

BACKGROUND

Aspects described herein relate to configuration of data center resources of a data center utilizing an elastic network for data transfers.

Bandwidth is conventionally provisioned to meet a projected peak data demand and paid for over the course of a contract that may stretch for several years. Peak demand may occur relatively infrequently, resulting in over-provisioning for a significant amount of time. This over-provisioning of the bandwidth results in excess costs to a customer who is paying for unused bandwidth over the course of the contract.

An attempt to lower costs by provisioning less bandwidth over the course of the contract is largely ineffective because of expensive overcharges when peak demand exceeds the amount of bandwidth provisioned. Bandwidth considerations and costs are especially important in large data center applications, such as data mirroring or backup, where the amount of data being transferred, and therefore the resulting bandwidth consumption, is potentially massive.

Elastic network relationships provide benefits over conventional static network relationships by allowing bandwidth allocation to change. However, the configuration of the data center components can present a bottleneck that prevents applications of the data center from leveraging the full potential afforded by a greater level of bandwidth allocation.

SUMMARY

Shortcomings of the prior art are overcome and additional advantages are provided through the provision of a computer-implemented method that includes obtaining indications of anticipated demand on a plurality of storage ports of a storage device of a data center, the anticipated demand being at least in part for storage input/output supporting transfer of data to or from a network; and dynamically adjusting storage port allocations based on the indications of anticipated demand and on real-time evaluation of workloads being serviced by the plurality of storage ports.

Further, a computer program product including a computer readable storage medium readable by a processor and storing instructions for execution by the processor is provided for performing a method that includes: obtaining indications of anticipated demand on a plurality of storage ports of a storage device of a data center, the anticipated demand being at least in part for storage input/output supporting transfer of data to or from a network; and dynamically adjusting storage port allocations based on the indications of anticipated demand and on real-time evaluation of workloads being serviced by the plurality of storage ports.

Yet further, a computer system is provided that includes a memory and a processor in communications with the memory, wherein the computer system is configured to perform a method including: obtaining indications of anticipated demand on a plurality of storage ports of a storage device of a data center, the anticipated demand being at least in part for storage input/output supporting transfer of data to or from a network; and dynamically adjusting storage port allocations based on the indications of anticipated demand and on real-time evaluation of workloads being serviced by the plurality of storage ports.

Aspects of the above dynamically and proactively adjust storage port allocations in anticipation of future demand, having an advantage in that it prepares the data center for demand changes to avoid bottlenecking, overutilization, and other potential inefficiencies. A particular context in which the dynamically adjusting is used is where the network is an elastic network in which network bandwidth allocation to the data center can change dynamically. The dynamically adjusting the storage port allocations may be further based on a change in the elastic network bandwidth allocation of the elastic network to help ensure that the data center can cater to a heightened level of bandwidth allocation, for instance.

An indication of anticipated demand can include a signal of a change in upcoming demand from an application of the data center, the upcoming demand being upcoming demand on a first storage port set including one or more first storage ports of the plurality of storage ports. Aspects can further include predicting, based on the signal of the change in upcoming demand from the application, and using a statistical model, a level of the upcoming demand on the first storage port set, and predicting a duration of the upcoming demand, where the dynamically adjusting storage port allocations includes allocating bandwidth of a second storage port set of one or more second storage ports of the plurality of storage ports to service at least some of the upcoming demand. This has an advantage of enabling proactive management of the queues based on anticipated demand, rather than reacting to demand change only after the change has taken place.

The anticipated demand can include a predicted near-future demand on one or more storage ports of the plurality of storage ports, the predicted near-future demand being predicted based on a current demand on the one or more storage ports. This has an advantage of also enabling proactive management of the queues based on anticipated demand, rather than reacting to demand change only after the change has taken place.

The real-time evaluation of the workloads being serviced by the plurality of storage ports can include identifying an over-utilized storage port of the plurality of storage ports based on an individual workload of the over-utilized storage port exceeding an overutilization threshold. The dynamically adjusting storage port allocations can include repurposing one or more unused or underutilized storage ports of the plurality of storage ports to service at least a portion of the workload of the over-utilized storage port. This has an advantage in that actively moving workload away from highly utilized ports avoids the potentially bigger problem of consuming a port's entire capacity.

The real-time evaluation of the workloads being serviced by the plurality of storage ports can include identifying that a range in individual workload levels of the plurality of storage ports exceeds a rebalancing threshold. The dynamically adjusting storage port allocations can include rebalancing the individual workloads to within the rebalancing threshold. This has an advantage in that smoothing deviations in workload levels across the considered ports spreads queueing delays across all of those ports.

The real-time evaluation of the workloads being serviced by the plurality of storage ports can include identifying traffic type flags of traffic of the workload. The dynamically adjusting storage port allocations can include queueing the traffic according to a prioritization schedule that prioritizes traffic based on traffic type. This has an advantage in that this method provides prioritization for groups of traffic of a common type, rather than, for instance, all traffic of a particular application.

The real-time evaluation of the workloads being serviced by the plurality of storage ports can include evaluating priority of incoming storage commits. The dynamically adjusting storage port allocations can include queuing the incoming storage commits according to a prioritization schedule that prioritizes storage commits based on storage commit type. This has an advantage in that prioritization is provided as between traffic of a common group (interunit, backend, etc.).

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects described herein provide dynamic quality of service for storage I/O port allocations, which advantageously provides flexibility to handle fluctuations in storage port demand, for instance fluctuations in data transfers when network bandwidth allocations change.

Figure 1:
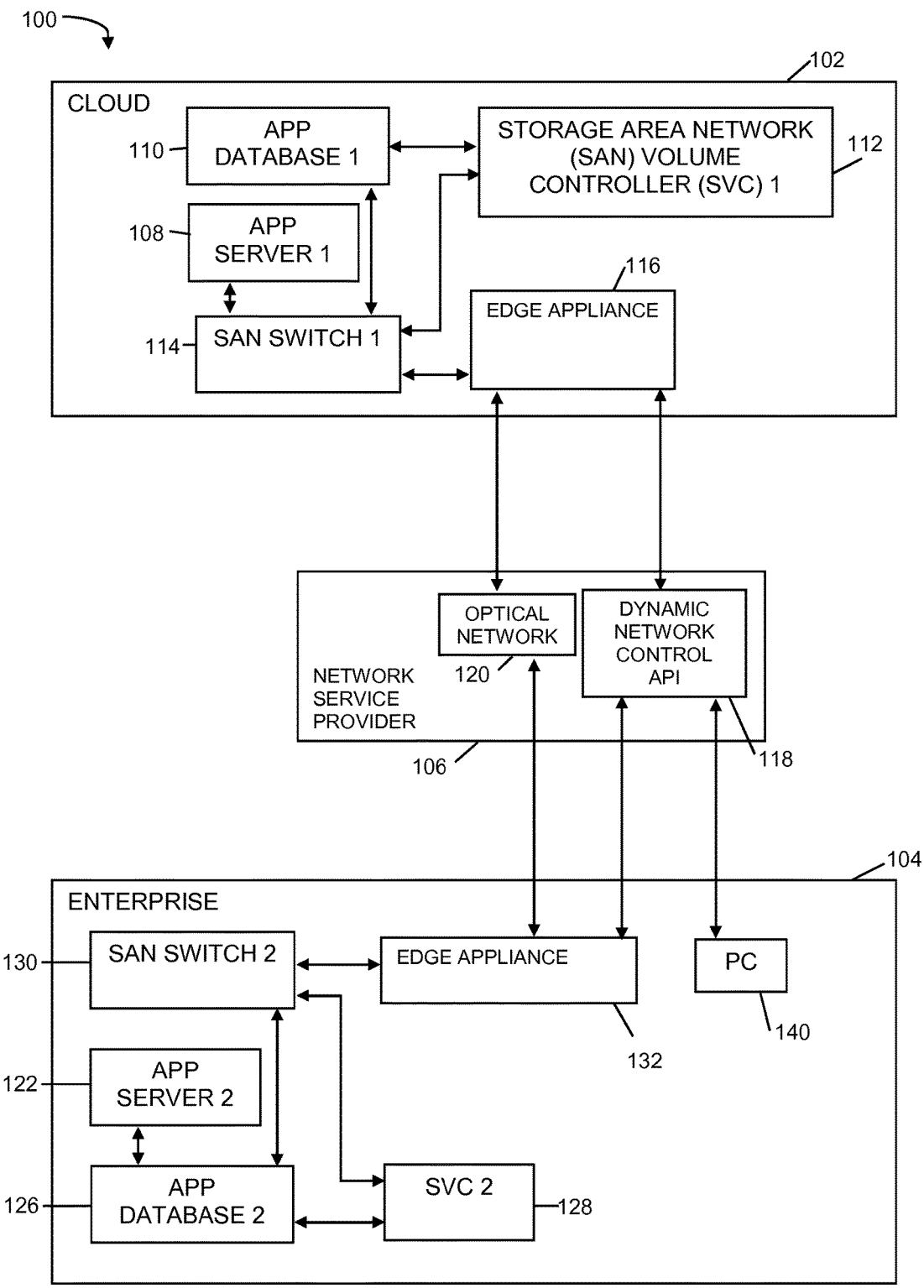
FIG. 1 depicts an example computing environment having elastic network capabilities, to incorporate and use aspects described herein.

FIG. 1 depicts an example computing environment having elastic network capabilities, to incorporate and use aspects described herein. In some examples, dedicated channel(s) across a network are utilized for data transfer from a first storage resource/location to a second storage resource/location. Environment 100 provides, as an example, data transfer between a first site 102 and a second site 104 using at least one network service provider (such as 106a) providing an elastic cloud computing network. In one embodiment, network service provider 106a provides a programmable WAN that is used for the data transfer.

First site 102 includes a first application server 108 (i.e. a computer) hosting one or more applications, a first application database 110, a first storage area network (SAN) volume controller (SVC) 112 (i.e., a first storage resource), a first SAN switch 114 and a first edge appliance 116, which may be a router or other edge device, for example. In one embodiment, application server 108 or SVC 112 runs a data replication application that replicates data in first application database 110 from first SVC 112 via first SAN switch 114 and first edge appliance 116.

Management of elastic network bandwidth allocation is provided in the environment. A feature of the environment 100 is that one or more processes can determine and inform a dynamic network control application programming interface (API) 118 of the network service provider about when and how much bandwidth of an elastic cloud computing network 120 should be allocated for transfer of data, which transfer may utilize a dedicated channel to the second site 104 via a network 120. In this example, network 120 is an optical network provided by network service provider 106a. In one embodiment, optical network 120 is used as a WAN. In another embodiment, optical network 120 is a Multiprotocol Label Switching (MPLS) network and application server 108 utilizes a Fiber Channel over Ethernet EDU01 network interface to connect first SAN switch 114 and first edge appliance 116 to the MPLS network.

Dynamic network control API 118 is executed, in one example, by a transport device (not shown), that is managed by network service provider 106a. Dynamic network control API 118 allows first SVC 112, second SVC 128, an edge appliance (116, 132), a PC 140, or any other component at site 102, 104, or another site to dynamically change bandwidth allocation from network service provider 106a. This is leveraged in accordance with aspects described herein to optimize bandwidth allocation and usage and therefore decrease the cost associated with transferring data using that bandwidth.

Second site 104 can include components similar to those of first site 102. Thus, in this example, second site similarly includes a second application server 122 (i.e., a computer), second application database 126, second SVC 128 (i.e., a second storage resource), second SAN switch 130, and a second edge appliance 132. In one embodiment, data is transferred from first site 102 to second site 104, i.e. from first SVC 112 via first SAN switch 114 and first edge appliance 116 over optical network 120 to second SVC 128 via second edge appliance 132 and second SAN switch 130. Data may be transferred similarly from second site 104 to first site 102.

Elastic network 106 may be used for transferring application data between two data centers (site 102, 104) connected via a dynamically-controllable elastic wide area network. With provision of an elastic network comes the ability to dynamically allocate additional bandwidth. However, a problem exists in the potential to produce a flood of data and spike in demand to access/store the data. The configuration of the resources of the data center factors into the ability to handle this situation. Described herein are facilities to ensure that data center resources are available to properly utilize the elasticity of the network while meeting application needs in an efficient and optimized manner. This advantageously enables the environment to be more flexible through the control of the network bandwidth and data center bandwidth to utilize that network bandwidth while servicing application demands on storage and other equipment as a result. It is noted, however, that aspects described herein apply outside of the elastic network realm.

In one aspect, re-purposing of storage I/O ports is provided based on predictive and/or real-time demand. Predictive demand can be issued from an application using a storage device/system having the storage I/O ports. The application can request temporary and/or time-limited storage I/O port bandwidth increases.

Additionally or alternatively, the storage system can react based on real-time demand by predicting near-future demand based on current I/O demand, and shifting quality of service queues, as one example, to allow the data replication or other form of data transfer to dynamically take priority where appropriate. Such a prediction may be done using statistical models that take as input the level of current demand and any other statistically significant inputs, and predict a level of demand using the model. As an example, real-time demand might suggest based on historical data that a spike in demand by an application is upcoming. The system can manage queues according to aspects described herein to prepare for that spike and handle it most efficiently.

Some aspects proposed herein for regulating and optimizing the storage processing include:

Dynamic port allocation and de-allocation based on real-time I/O demand at the storage system level, and/or predictive/preemptive demand from the application or applications attached. Conventionally, these allocations are static, where adding or reallocating ports elsewhere would not occur;

Dynamic throttling of ports based on the priority of the tasks incoming at the storage system. There is a bandwidth/capacity of each port and a priority assignment to the traffic on that port is enabled and can be adjusted. Rankings of priority are used to raise or lower a particular set of traffic's frequency of placement in the storage port queues. Bandwidth of a port can refer to the amount of transmits on the port, where each port will have an initial assigned number of transmits. The Fibre Channel technology uses a credit-based flow control mechanism, for example;

Checking replication (or other specific I/O) demand based on reports from the application(s) as well as flagging of the traffic type within the storage system. Flagging internal traffic, for instance, could give it priority inside the storage system. More generally, any way to differentiate traffic from the other traffic flowing through the system can be used for prioritization;

Checking port utilization levels based on real-time demand at the storage system and shifting I/O workload to dynamically balance workload; and Checking types of traffic on each port based on an understanding of the traffic types. In one example, the traffic type is tied to the layers of the Open Systems Interconnection model (OSI model) maintained by the International Standards Organization as identification ISO/IEC 7498-1. This can make priority decisions based on the particular layer to which the traffic belongs.

Aspects described herein may be performed by a storage device, such as SVC 128 of FIG. 1, or a DS8000 disk storage system offered by International Business Machines Corporation, Armonk, N.Y., U.S.A. Some of these aspects are illustrated and described with reference to FIG. 2, which depicts example methods of dynamic quality of service for storage input/output port allocation, in accordance with aspects described herein.

Figure 2:
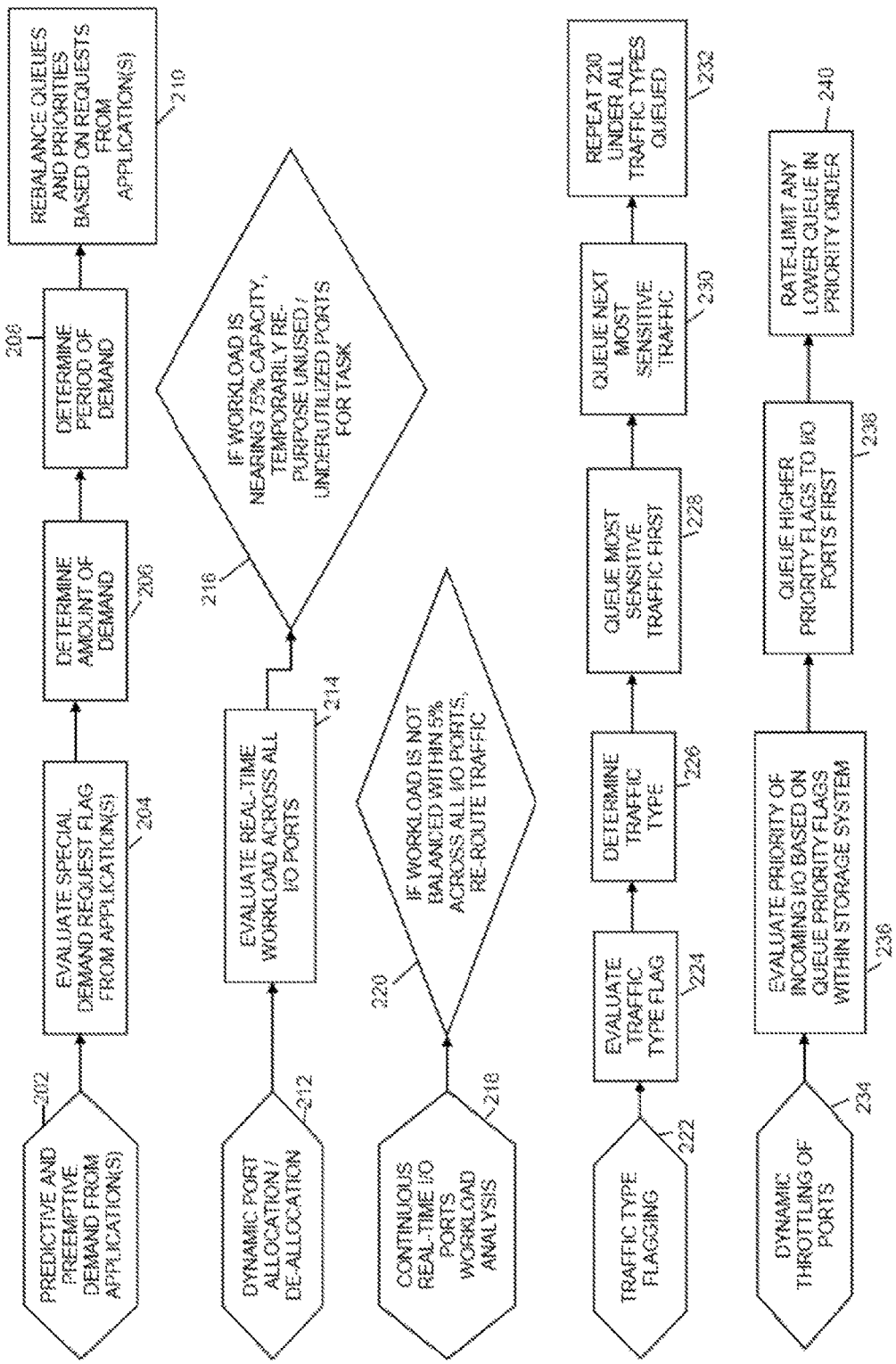
FIG. 2 depicts example features of dynamic quality of service for storage input/output port allocation, in accordance with aspects described herein.

FIG. 2 presents several features of quality of service that progresses in granularity from least granular (method 202) to most granular (232). One or more of these methods are performed periodically or aperiodically, perhaps triggered based on detecting a bandwidth allocation change of the elastic network. A bandwidth allocation change is pertinent because it might have an effect on storage I/O port demand.

A first method (202) presents quality of service through predictive and preemptive demand from application(s). The applications have the ability to notify the storage unit (or other device with allocation control) about the need for some prioritization. Initially, the method includes the storage device (in this example) evaluating a special demand request flag from an application (204). The flag can be attached to the traffic itself, or could be sent/received out-of-band. The flag can indicate a change (for instance, increase) in upcoming demand. Then, the storage device determines an amount of demand (206) followed by a period of that demand (208). In this regard, a statistical model may be used to determine a level of upcoming demand and duration of that demand based on some indication provided by the application. An application might specify levels of demand, either numerical or categorical, like 'low', 'medium' or 'high'. The application's signal can indicate an anticipated upcoming demand change, for instance from medium to high demand. The storage system (or other component performing the method) can model the indication in a particular way to predict the level and duration of upcoming demand. Any statistical or other model can be used.

Based on the predicted amount and period of upcoming demand, the method includes the storage device rebalancing the queues and priorities based on the requests from the application(s) (210). As noted above, each storage I/O port has an associated queue. After an application signals that it will increase demand, the storage device predicts the level and duration of the anticipated demand and then examines the ports to identify properties of their capacities, such as the utilization and remaining capacity on the port and/or recent historical usage. The queues can then be rebalanced as desired. In one example, bandwidth is taken from one or more ports and given to the application issuing the demand. For instance, bandwidth/capacity of the one or more ports is released to the port(s) the application uses in order to give them more bandwidth. Additionally, or as an alternative to reallocating bandwidth, some traffic can be sent using those one or more less-utilized ports. This is useful in a scenario where a sudden spike in traffic is expected. Accordingly, the first method (202) is used to prioritize particular applications. An advantage of this is that it enables proactive management of the queues based on anticipated demand signaled by the application.

Repurposing too much bandwidth from one port for other port(s) might cause a performance impact for the applications utilizing that one port. A second method (212) presents quality of service through dynamic allocation/de-allocation to distribute heavy workloads. As an example, if workload on a particular port exceeds an overutilization threshold capacity (say 75% of total capacity of that port), some traffic can be shifted to other port(s) so as to avoid adversely impacting performance of the items using the overutilized port.

Initially, the storage device evaluates real-time workload across all I/O ports (214). Based on that evaluation, the storage device determines whether workload is nearing 75% (the overutilization threshold in this example) capacity on a given port, and if so, then the storage device temporarily repurposes unused or underutilized ports for the application task(s) (216). The overutilization threshold in this example is 75%, though the threshold could be some threshold based on any given percentage. The threshold may be tuned according to any of various parameters, either automatically or manually. In one example, the threshold is a function of how steep the spikes in utilization are—steep spikes may warrant a lower utilization threshold (causing rebalancing at a lower percentage) to increase the chances that the port can handle a steeper spike. An advantage of actively moving workload away from highly utilized ports is that it avoids the potentially bigger problem of consuming a port's entire capacity.

A third method (218) provides workload rebalancing through continuous real-time I/O ports workload analysis. In this aspect, the storage device identifies whether workload is balanced across all I/O ports within some range (say 5% of each other), and if not, then the storage device rebalances workloads by re-routing traffic to different ports to balance them to within the range (220). In this example, 5% is the rebalancing threshold, where the storage device dynamically adjusts storage port allocations to rebalance the individual workloads to within the rebalancing threshold. As a simple example, assume ports A, B, and C have workloads of 65%, 70%, and 80%, respectively, and the rebalancing threshold is 5%. Here, the range in workload percentage is 15% (difference between 65% and 80%), so the storage device rebalances the workload to within 5% range across the ports. Any of various strategies can be used for the rebalancing. In one example, the workloads are rebalanced to the average level (i.e. 65+70+80/3=71.6%). In other examples, the rebalancing uses weightings to balance the workloads to, e.g., 70%, 70%, and 75% (for ports A, B, and C, respectively). An advantage to smoothing deviations in workload levels across the considered ports is that it spreads queueing delays across all of those ports.

A fourth method (222) provides quality of service through traffic type flagging in which flags are attached by the traffic originators and traffic is prioritized according to a prioritization schedule. Application traffic is flagged as such by the application(s), operating system traffic is flagged as such by the operating systems, etc. In this method, the storage device evaluates traffic type flags in the traffic (224) to determine the traffic types of the traffic (226). The storage device queues the traffic based on sensitivity. This queues the most sensitive type of traffic first (228) followed by the next most sensitive type of traffic (230), and that repeats until all traffic types have been queued (232). In one example, the traffic type is broken down into host, backend, interunit, or replication, though any component in the workflow may be allowed to specify a flag. In this example, the most sensitive traffic might be interunit traffic, followed by host, backend, and then replication data, though it is noted that the prioritization schedule may be user-configurable. An advantage is that this method provides prioritization for groups of traffic of a common type, rather than, for instance, all traffic of a particular application.

A fifth method (234) provides a refinement of the traffic type flagging, in which ports are dynamically throttled. The method includes the storage device evaluating priority of incoming I/O based on queue priority flags within the storage system (236). The storage device can queue higher priority flags to I/O ports first (238), and rate-limit lower queues in the priority order (240). Incoming I/O comes from the application side-applications are sending data to be committed. It is typically more important to commit data if queued than to fetch and return to the application data that it requested. In other words, committing data is usually more important from a priority standpoint than retrieving it. Using the example above, the method examines the incoming I/O and if it is an interunit commit, it will be committed before an interunit retrieval (for instance), or a backend commit. A prioritization schedule can prioritize storage commits based on storage commit type. An advantage is that prioritization is provided as between traffic of a common group (interunit, backend, etc.).

Figure 3:
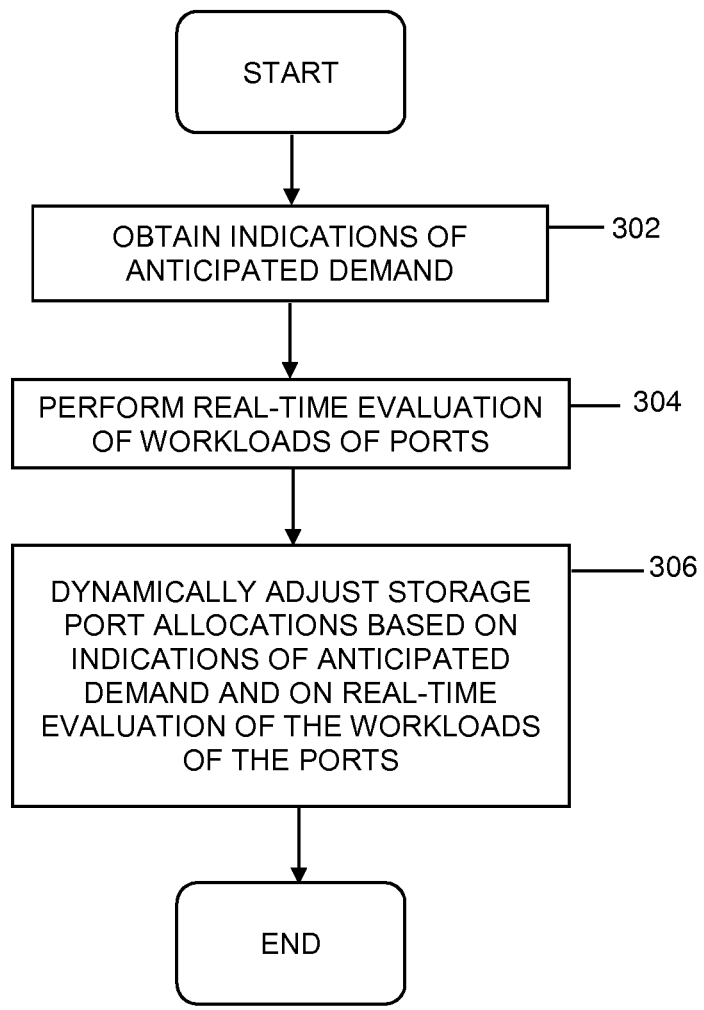
FIG. 3 depicts an example process for dynamic quality of service for storage port allocation, in accordance with aspects described herein.

Accordingly, described herein are processes for dynamic quality of service for storage port allocation, an example of which is presented with reference to FIG. 3. In one example, the process is performed by a storage device, such as SVC or a DS8000 of a data center. The storage device (or other device) performs the process continually, periodically, or aperiodically, for example based on an event. In one example, the process is invoked based on a bandwidth allocation change of an elastic network.

The process begins with the storage device obtaining indications of anticipated demand on a plurality of storage ports of a storage device of a data center (302). The anticipated demand may be at least in part for storage input/output supporting transfer of data to or from a network, such as an elastic network.

As a specific example, an indication of the anticipated demand is a signal of a change in upcoming demand from an application of the data center. An example change is an indication that the demand will change from one classification (e.g. 'medium demand') to another classification (e.g. 'high' demand). The upcoming demand can be upcoming demand on a first set of one or more storage ports (i.e. first storage port set) of the plurality of storage ports. In this event, based on the signal of the change in upcoming demand from the application, a level of that upcoming demand on the first storage port set can be predicted using a statistical model, and a duration of that upcoming demand can also be predicted, perhaps using the same model or another model. The statistical model can use parameters to determine a level/duration of that demand to within a specified or default confidence level.

In another example, the anticipated demand includes a predicted near-future demand on one or more storage ports of the plurality of storage ports, the predicted near-future demand being predicted based on a current demand on the one or more storage ports. For instance, current demand on a given port at a given time of day might be at a level that suggests what the demand will be at some later time.

The process continues with the storage device performing real-time evaluation of the workloads being serviced by the plurality of storage ports (304), and then dynamically adjusting storage port allocations based on the indications of anticipated demand and on the real-time evaluation of the workloads being serviced by the plurality of storage ports (306). Storage port allocations refers to the queueing of traffic on the ports and/or bandwidth adjustments affecting that queueing, as examples.

In the scenario above where the level and duration of upcoming demand on a first storage port set is predicted, the dynamically adjusting storage port allocations can include allocating bandwidth of a second storage port set (i.e. one or more second storage ports of the plurality of storage ports) to service at least some of the upcoming demand on that first storage port set. The allocating bandwidth of the second storage port set can include one or more of: (i) releasing bandwidth of the second storage port set to the first storage port set for use by the application, or (ii) utilizing the second storage port set to service the at least some of the upcoming demand. The amount to allocate can depend on the predicted increase in demand level, for instance may be some percentage (100%, 90%, 105%) of the predicted increase.

In one example, the real-time evaluation of the workloads being serviced by the plurality of storage ports includes identifying an over-utilized storage port of the plurality of storage ports based on an individual workload of the over-utilized storage port exceeding an overutilization threshold. In this case, the dynamically adjusting storage port allocations can include repurposing one or more unused or underutilized storage ports of the plurality of storage ports to service at least a portion of the workload of the over-utilized storage port.

In another example, the real-time evaluation of the workloads being serviced by the plurality of storage ports includes identifying that a range in individual workload levels of the plurality of storage ports exceeds a rebalancing threshold, in which case the dynamically adjusting storage port allocations includes rebalancing the individual workloads to within the rebalancing threshold.

In a further example, the real-time evaluation of the workloads being serviced by the plurality of storage ports includes identifying traffic type flags of traffic of the workload, and the dynamically adjusting storage port allocations includes queueing the traffic according to a prioritization schedule that prioritizes traffic based on traffic type.

In yet another example, the real-time evaluation of the workloads being serviced by the plurality of storage ports includes evaluating priority of incoming storage commits, and the dynamically adjusting storage port allocations includes queuing the incoming storage commits according to a prioritization schedule that prioritizes storage commits based on storage commit type.

In examples where the network is an elastic network, the dynamically adjusting the storage port allocations may be further based on a change in elastic network bandwidth allocation of the elastic network, for example based on being notified of a change. In this regard, the notification can serves as an indication of a change in upcoming demand. The particular magnitude of the change made (increase by 10%, decrease by 1 Gb/sec) can be provided as part of that notification, and the system can respond based on that.

Processes described herein may be performed singly or collectively by one or more computer systems, such as computer system(s) described below with reference to FIG. 4.

Figure 4:
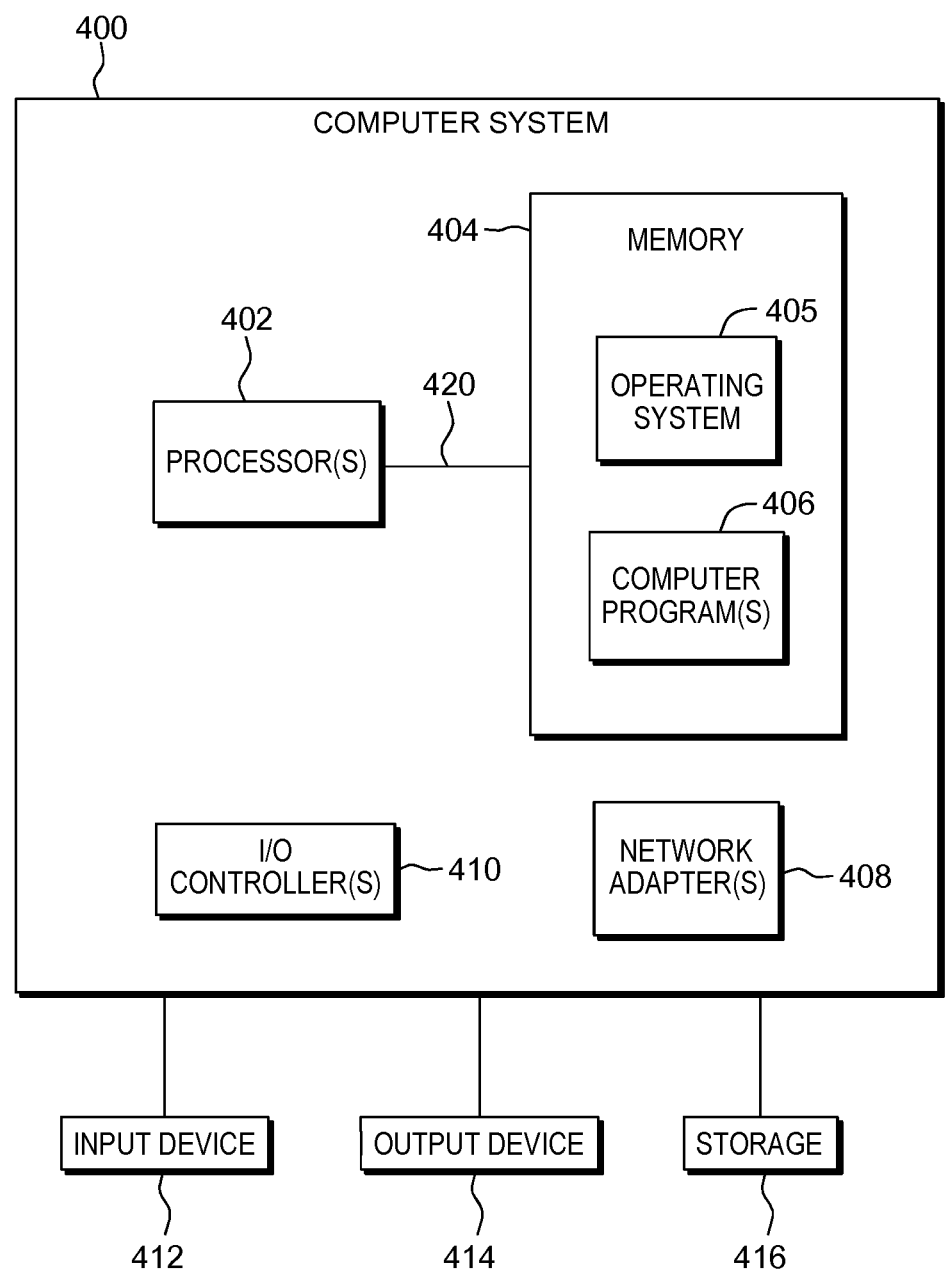
FIG. 4 depicts an example of a computer system to incorporate or use aspects described herein.

FIG. 4 depicts one example of a computer system to incorporate and use aspects described herein. A computer system may also be referred to herein as a processing device/system or computing device/system, or simply a computer. Computer system 400 may be based on one or more of various system architectures such as those offered by International Business Machines Corporation (Armonk, N.Y., USA) or Intel Corporation (Santa Clara, Calif., USA), as examples.

Computer system 400 is suitable for storing and/or executing program code and includes at least one processor 402 coupled directly or indirectly to memory 404 through, e.g., a system bus 420. In operation, processor(s) 402 obtain from memory 404 one or more instructions for execution by the processors. Memory 404 may include local memory employed during actual execution of the program code, bulk storage, and cache memories which provide temporary storage of at least some program code in order to reduce the number of times code must be retrieved from bulk storage during program code execution. A non-limiting list of examples of memory 404 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 404 includes an operating system 405 and one or more computer programs 406, for instance programs to perform aspects described herein.

Input/Output (I/O) devices 412, 414 (including but not limited to displays, microphones, speakers, accelerometers, gyroscopes, magnetometers, light sensors, proximity sensors, GPS devices, cameras, etc.) may be coupled to the system either directly or through I/O controllers 410.

Network adapters 408 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 408 used in computer system.

Computer system 400 may be coupled to storage 416 (e.g., a non-volatile storage area, such as magnetic disk drives, optical disk drives, a tape drive, etc.), having one or more databases. Storage 416 may include an internal storage device or an attached or network accessible storage. Computer programs in storage 416 may be loaded into memory 404 and executed by a processor 402 in a manner known in the art.

The computer system 400 may include fewer components than illustrated, additional components not illustrated herein, or some combination of the components illustrated and additional components. Computer system 400 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 5:
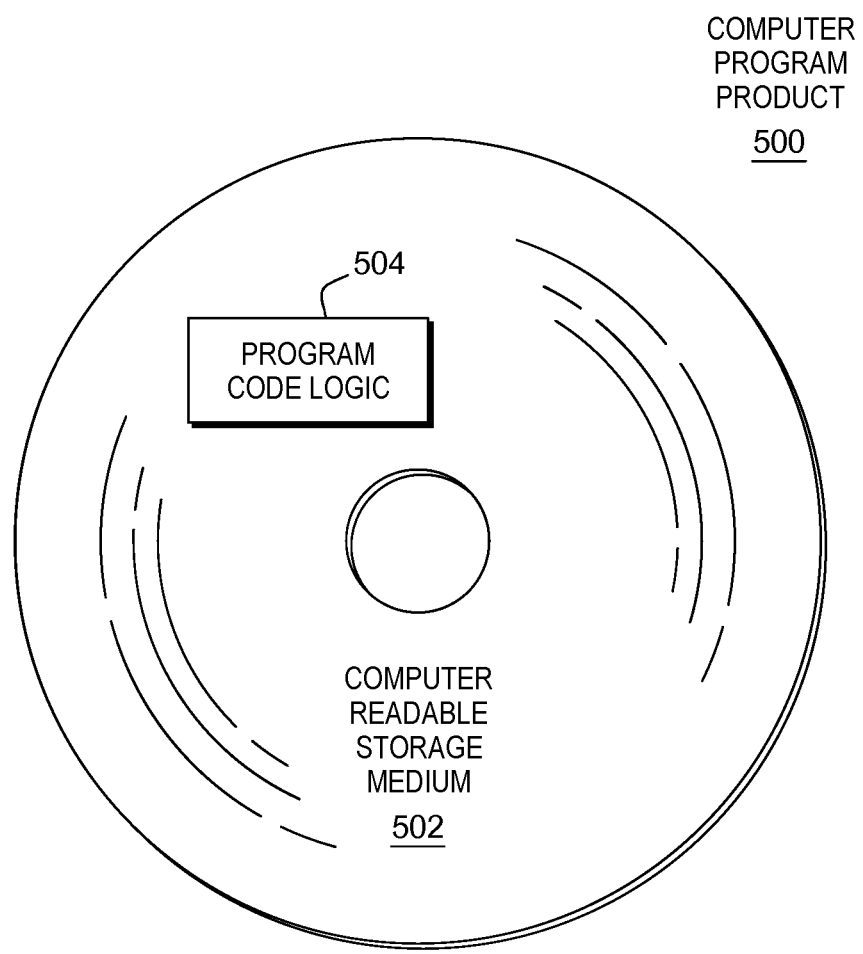
FIG. 5 depicts one embodiment of a computer program product.

Referring to FIG. 5, in one example, a computer program product 500 includes, for instance, one or more computer readable storage media 502 to store computer readable program code means, logic and/or instructions 504 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   receiving by a storage device of a data center, from an application using the storage device, a notification of a change in elastic network bandwidth allocation provisioned to the data center from an elastic network service provider of an elastic network;
   based on the notification, obtaining indications of, and determining, anticipated demand on a plurality of storage ports of the storage device, the anticipated demand being at least in part for storage input/output supporting transfer of data to or from the elastic network, wherein an indication of the anticipated demand indicates an amount of the change in the elastic network bandwidth allocation, and the anticipated demand is based at least in part on the change in the elastic network bandwidth allocation and the indicated amount of that change; and
   the storage device dynamically adjusting storage port allocations based on the determined anticipated demand and on real-time evaluation of workloads being serviced by the plurality of storage ports, the dynamically adjusting comprising adjusting respective individual storage input/output bandwidth or workload for at least one storage port of the plurality of storage ports, wherein the dynamically adjusting is performed based on the notification of the change in elastic network bandwidth allocation provisioned to the data center.

2. The method of claim 1, wherein an indication of anticipated demand comprises a signal of a change in upcoming demand from an application of the data center, the upcoming demand being upcoming demand on a first storage port set comprising one or more first storage ports of the plurality of storage ports.

3. The method of claim 2, further comprising predicting, based on the signal of the change in upcoming demand from the application of the data center, and using a statistical model, a level of the upcoming demand on the first storage port set, and predicting a duration of the upcoming demand, wherein the dynamically adjusting storage port allocations comprises allocating bandwidth of a second storage port set of one or more second storage ports of the plurality of storage ports to service at least some of the upcoming demand.

4. The method of claim 3, wherein the allocating bandwidth of the second storage port set comprises one or more of: (i) releasing bandwidth of the second storage port set to the first storage port set for use by the application of the data center, or (ii) utilizing the second storage port set to service the at least some of the upcoming demand.

5. The method of claim 1, wherein the anticipated demand comprises a predicted near-future demand on one or more storage ports of the plurality of storage ports, the predicted near-future demand being predicted based on a current demand on the one or more storage ports.

6. The method of claim 1, wherein the real-time evaluation of the workloads being serviced by the plurality of storage ports comprises identifying an over-utilized storage port of the plurality of storage ports based on an individual workload currently being serviced by the over-utilized storage port exceeding an overutilization threshold, and wherein the dynamically adjusting storage port allocations comprises repurposing one or more unused or underutilized storage ports of the plurality of storage ports to service at least a portion of the workload currently being serviced by the over-utilized storage port.

7. The method of claim 1, wherein the real-time evaluation of the workloads being serviced by the plurality of storage ports comprises identifying that a range in individual workload levels of the plurality of storage ports exceeds a rebalancing threshold, and wherein the dynamically adjusting storage port allocations comprises rebalancing the individual workloads to within the rebalancing threshold.

8. The method of claim 1, wherein the real-time evaluation of the workloads being serviced by the plurality of storage ports comprises identifying traffic type flags of traffic of the workload, and wherein the dynamically adjusting storage port allocations comprises queuing the traffic according to a prioritization schedule that prioritizes traffic based on traffic type.

9. The method of claim 1, wherein the real-time evaluation of the workloads being serviced by the plurality of storage ports comprises evaluating priority of incoming storage commits, and wherein the dynamically adjusting storage port allocations comprises queuing the incoming storage commits according to a prioritization schedule that prioritizes storage commits based on storage commit type.

10. A computer program product comprising:
a computer readable storage medium readable by a processing circuit and storing instructions for execution by the processing circuit for performing a method comprising:
receiving by a storage device of a data center, from an application using the storage device, a notification of a change in elastic network bandwidth allocation provisioned to the data center from an elastic network service provider of an elastic network;
based on the notification, obtaining indications of, and determining, anticipated demand on a plurality of storage ports of the storage device, the anticipated demand being at least in part for storage input/output supporting transfer of data to or from the elastic network, wherein and indication of the anticipated demand indicates an amount of the change in the elastic network bandwidth allocation, and the anticipated demand is based at least in part on the change in the elastic network bandwidth allocation and the indicated amount of that chance; and
the storage device dynamically adjusting storage port allocations based on the determined anticipated demand and on real-time evaluation of workloads being serviced by the plurality of storage ports, the dynamically adjusting comprising adjusting respective individual storage input/output bandwidth or workload for at least one storage port of the plurality of storage ports, wherein the dynamically adjusting is performed based on the notification of the change in elastic network bandwidth allocation provisioned to the data center.

11. The computer program product of claim 10, wherein an indication of anticipated demand comprises a signal of a change in upcoming demand from an application of the data center, the upcoming demand being upcoming demand on a first storage port set comprising one or more first storage ports of the plurality of storage ports, and wherein the method further comprises predicting, based on the signal of the change in upcoming demand from the application of the data center, and using a statistical model, a level of the upcoming demand on the first storage port set, and predicting a duration of the upcoming demand, wherein the dynamically adjusting storage port allocations comprises allocating bandwidth of a second storage port set of one or more second storage ports of the plurality of storage ports to service at least some of the upcoming demand.

12. The computer program product of claim 10, wherein the anticipated demand comprises a predicted near-future demand on one or more storage ports of the plurality of storage ports, the predicted near-future demand being predicted based on a current demand on the one or more storage ports.

13. The computer program product of claim 10, wherein the real-time evaluation of the workloads being serviced by the plurality of storage ports comprises identifying an over-utilized storage port of the plurality of storage ports based on an individual workload currently being serviced by the over-utilized storage port exceeding an overutilization threshold, and wherein the dynamically adjusting storage port allocations comprises repurposing one or more unused or underutilized storage ports of the plurality of storage ports to service at least a portion of the workload currently being serviced by the over-utilized storage port.

14. The computer program product of claim 10, wherein the real-time evaluation of the workloads being serviced by the plurality of storage ports comprises identifying that a range in individual workload levels of the plurality of storage ports exceeds a rebalancing threshold, and wherein the dynamically adjusting storage port allocations comprises rebalancing the individual workloads to within the rebalancing threshold.

15. The computer program product of claim 10, wherein the real-time evaluation of the workloads being serviced by the plurality of storage ports comprises identifying traffic type flags of traffic of the workload, and wherein the dynamically adjusting storage port allocations comprises queuing the traffic according to a prioritization schedule that prioritizes traffic based on traffic type.

16. The computer program product of claim 10, wherein the real-time evaluation of the workloads being serviced by the plurality of storage ports comprises evaluating priority of incoming storage commits, and wherein the dynamically adjusting storage port allocations comprises queuing the incoming storage commits according to a prioritization schedule that prioritizes storage commits based on storage commit type.

17. A computer system comprising:
a memory; and
a processor in communication with the memory, wherein the computer system is configured to perform a method, the method comprising:
receiving by a storage device of a data center, from an application using the storage device, a notification of a change in elastic network bandwidth allocation provisioned to the data center from an elastic network service provider of an elastic network;
based on the notification, obtaining indications of, and determining, anticipated demand on a plurality of storage ports of the storage device, the anticipated demand being at least in part for storage input/output supporting transfer of data to or from the elastic network, wherein an indication of the anticipated demand indicates an amount of the change in the elastic network bandwidth allocation, and the anticipated demand is based at least in part on the change in the elastic network bandwidth allocation and the indicated amount of that change; and
the storage device dynamically adjusting storage port allocations based on the determined anticipated demand and on real-time evaluation of workloads being serviced by the plurality of storage ports, the dynamically adjusting comprising adjusting respective individual storage input/output bandwidth or workload for at least one storage port of the plurality of storage ports, wherein the dynamically adjusting is performed based on the notification of the change in elastic network bandwidth allocation provisioned to the data center.

18. The computer system of claim 17, wherein an indication of anticipated demand comprises a signal of a change in upcoming demand from an application of the data center, the upcoming demand being upcoming demand on a first storage port set comprising one or more first storage ports of the plurality of storage ports, and wherein the method further comprises predicting, based on the signal of the change in upcoming demand from the application of the data center, and using a statistical model, a level of the upcoming demand on the first storage port set, and predicting a duration of the upcoming demand, wherein the dynamically adjusting storage port allocations comprises allocating bandwidth of a second storage port set of one or more second storage ports of the plurality of storage ports to service at least some of the upcoming demand.

19. The computer system of claim 17, wherein the anticipated demand comprises a predicted near-future demand on one or more storage ports of the plurality of storage ports, the predicted near-future demand being predicted based on a current demand on the one or more storage ports.

* * * * *